United States Patent
Brown (12) United States Patent (10) Patent No.: US 6,398,679 B1
(45) Date of Patent: Jun. 4, 2002

(54) DUAL DRIVE CONTINUOUSLY VARIABLE TRANSMISSION

(76) Inventor: Albert W. Brown, 1207 Pembroke La., Newport Beach, CA (US) 92660

( * ) Notice: Subject to any disclaimer, the term of this patent is extended or adjusted under 35 U.S.C. 154(b) by 0 days.

(21) Appl. No.: 09/395,467

(22) Filed: Sep. 14, 1999

Related U.S. Application Data
(60) Provisional application No. 60/100,220, filed on Sep. 14, 1998.

(30) Foreign Application Priority Data

Sep. 14, 1999 (WO) ................................ PCTUS9921059

(51) Int. Cl.$^7$ ............................ F16H 9/20; F16H 55/56; F16H 63/02
(52) U.S. Cl. ............................... 474/35; 474/14; 474/30
(58) Field of Search ............................. 474/34, 35, 33, 474/36, 17, 8, 18, 28, 69, 14

(56) References Cited

U.S. PATENT DOCUMENTS

| | | | |
|---|---|---|---|
| 917,684 A | | 4/1909 | Van Nort |
| 1,727,232 A | | 9/1929 | Farrell |
| 1,819,227 A | | 8/1931 | Chorlton |
| 2,158,047 A | | 5/1939 | Weston |
| 2,183,267 A | | 12/1939 | Rieser |
| 2,218,712 A | | 10/1940 | Johnson |
| 2,221,166 A | | 11/1940 | Heinrich et al. |
| 2,256,114 A | | 9/1941 | Heyer |
| 2,258,970 A | * | 10/1941 | Buettel ...................... 474/35 X |
| 2,293,638 A | | 8/1942 | Clarkson |
| 2,410,915 A | | 11/1946 | Willmott |
| 2,522,353 A | * | 9/1950 | Eserkaln ...................... 474/35 X |
| 2,648,987 A | | 8/1953 | Curtis |
| 2,770,978 A | * | 11/1956 | Troemel ...................... 474/35 X |
| 2,831,358 A | | 4/1958 | Michie |
| 2,927,470 A | * | 3/1960 | Heyer ........................ 474/35 X |
| 3,280,649 A | | 10/1966 | Bruet |
| 3,380,315 A | * | 4/1968 | Emerson ..................... 474/35 X |
| 3,638,744 A | * | 2/1972 | Washizawa ................. 474/14 X |
| 3,672,166 A | | 6/1972 | Isaac |
| 3,699,827 A | | 10/1972 | Vogel |
| 3,715,928 A | * | 2/1973 | Case et al. .................. 474/34 X |
| 3,762,231 A | | 10/1973 | Pettigrew |
| 3,828,555 A | | 8/1974 | Capdevielle |
| 3,903,662 A | | 9/1975 | Baughman et al. |
| 4,026,161 A | | 5/1977 | Vogel |
| 4,056,987 A | | 11/1977 | Hoffmann |

(List continued on next page.)

FOREIGN PATENT DOCUMENTS

| | | |
|---|---|---|
| DE | 906395 | 3/1954 |
| DE | 4305102 | 8/1994 |
| FR | 1130289 | 9/1956 |
| FR | 2 327 456 | 5/1977 |

OTHER PUBLICATIONS

1996 CVT Service Manual Supplement, pp. 14–2 through 14–31.

*Primary Examiner*—David A. Bucci
*Assistant Examiner*—Marcus Charles
(74) *Attorney, Agent, or Firm*—Knobbbe, Martens, Olson & Bear, LLP (57) ABSTRACT

A continuously variable transmission has dual driving connections extending between a first shaft and a second shaft. The driving connections generally include a drive pulley, a driven pulley and a belt. The pulleys each comprise a fixed portion and an axially moveable portion. Movement between the two portions changes an effective diameter of the pulley. The moveable portions of the drive pulley are positioned next to one another on the first shaft and the moveable portions are interposed between the fixed portions of the drive pulleys. The fixed portions of the driven pulleys, on the other hand, are interposed between the moveable portions. The driven pulleys are free to rotate relative to the second shaft. A differential is positioned between the fixed portions of the driven pulleys, connects the two fixed portions and transfers the torque from the driven pulleys to the second shaft.

41 Claims, 8 Drawing Sheets

U.S. PATENT DOCUMENTS

| | | |
|---|---|---|
| 4,125,037 A | 11/1978 | Palmer et al. |
| 4,165,795 A | 8/1979 | Lynch et al. |
| 4,194,608 A | 3/1980 | Usui et al. |
| 4,324,156 A | 4/1982 | Iwanaga et al. |
| 4,354,547 A | 10/1982 | Suguira |
| 4,378,221 A | 3/1983 | Huff et al. |
| 4,449,423 A | 5/1984 | Carriere |
| 4,452,494 A | 6/1984 | Kadota |
| 4,464,144 A | 8/1984 | Kobayashi |
| 4,474,079 A | 10/1984 | Crockett |
| 4,539,867 A | 9/1985 | Ishimi |
| 4,548,099 A | 10/1985 | Wayman et al. |
| 4,679,396 A | 7/1987 | Heggie |
| 4,691,592 A | 9/1987 | de Brie Perry |
| 4,705,492 A | 11/1987 | Hattori et al. |
| 4,713,041 A | 12/1987 | Stockton |
| 4,857,034 A | 8/1989 | Kouno et al. |
| 4,872,371 A | 10/1989 | Fellows |
| 4,875,893 A | 10/1989 | Giacosa |
| 4,901,597 A | 2/1990 | Hattori et al. |
| 4,947,700 A | 8/1990 | Kern et al. |
| 4,967,621 A | 11/1990 | Soga et al. |
| 5,006,092 A * | 4/1991 | Neuman et al. .......... 474/17 X |
| 5,006,093 A | 4/1991 | Itoh et al. |
| 5,090,527 A | 2/1992 | Imamura et al. |
| 5,121,936 A | 6/1992 | Cowan |
| 5,167,591 A | 12/1992 | Cowan |
| 5,176,579 A * | 1/1993 | Ohsono et al. ........... 474/18 X |
| 5,186,692 A | 2/1993 | Gleasman et al. |
| 5,215,323 A | 6/1993 | Cowan |
| 5,274,736 A | 12/1993 | Rohr, Jr. |
| 5,314,037 A | 5/1994 | Shaw et al. |
| 5,323,737 A | 6/1994 | Farrell |
| 5,358,450 A | 10/1994 | Robert |
| 5,529,138 A | 6/1996 | Shaw et al. |
| 5,562,555 A | 10/1996 | Peterson |
| 5,647,802 A | 7/1997 | Gleasman et al. |
| 5,647,810 A | 7/1997 | Huddleston |
| 5,692,983 A | 12/1997 | Bostelmann |

* cited by examiner

DUAL DRIVE CONTINUOUSLY VARIABLE TRANSMISSION

CROSS REFERENCE TO RELATED APPLICATIONS

This application claims the benefit of priority of provisional application No. 60/100,220, filed Sep. 14, 1998 under 35 USC 119(e).

BACKGROUND OF THE INVENTION

1. Field of the Invention

The present invention is related to continuously variable transmissions. More specifically, the present invention is related to dual drive continuously variable transmissions having dual drives slaved together for transfer of torque from input shafts to output shafts.

2. Related Art

Continuously variable transmissions ("CVTs") are a type of transmission capable of transferring torque from an input shaft to an output shaft. The CVT allows the speed change to occur within the transmission while the input speed is maintained at a substantially constant rotational velocity. Thus, the CVT is a transmission that is capable of converting input speeds into output speeds that are steplessly variable within a given range. Recently, these transmissions have been used in the automotive industry for transferring torque between an input shaft and an output shaft of a vehicle employing a low horsepower engine.

The most common of such CVT drives for automobiles has used a steel segmented V-belt operating with axially moveable steel pulleys that force belt radial movement along the conical pulley surfaces to change the speed ratio between the driven and the output shaft, usually by a combination of springs and hydraulic generated force. Such belts operate the drive by transferring the torque from an input shaft, through a single input pulley, to a single output pulley and, ultimately, to an output shaft. Drives of this type have been successful and, as mentioned above, are currently being commercially produced in the lower horsepower range of passenger automobiles.

Operational qualities of CVT drives are well known in the automotive industry, including their shortcomings. Continuous research and development effort is being expended in the automobile industry to extend the capabilities of the belt and pulley basic concept because of the perceived advantages to be realized over more traditional transmissions now in production.

SUMMARY OF THE INVENTION

One of the shortcomings of some current CVT drives includes limitations on operation in the higher horsepower range, the solving of which is the genesis of this invention. Thus, the present invention was designed to handle increased horsepower over single belt CVT systems. Specifically, a dual belt CVT system was created.

The creation of a dual belt CVT system, however, revealed other drawbacks. Included among these drawbacks where the complication of system construction and increased size and cost, as well as loss of the prime mover energy due to what is termed bucking of the belts against each other. The bucking of the belts occurs, for instance, when the operation of a dual drive system is not synchronous. The difficulty is further magnified when such a system must be continuously variable and automatically controlled as is required in an automotive application.

Thus, the present invention involves coupling two CVT belt systems operating in parallel. Thus, each of the CVT belt systems absorbs half the input torque of the input shaft and delivers it to the output shaft. The torque transfer occurs in the present invention with very low power loss due to an advantageously coupling of components and synchronous driving of the belt systems. Similar to some single belt systems in use, the present invention changes the pulley ratios using selective pressurization of the pulleys. Specifically, each pulley includes a biased portion that, when pressurized, alters the effective diameter of the pulley.

Because two parallel continuously variable drives, which are positioned on common shafts, may not naturally operate synchronously in the serial production world, three additional elements can be employed singularly or together to accomplish the necessary compatibility without excessive energy loss or undue complication. One such element is a device, hydraulic or mechanical, to precisely and synchronously, control the moveable halves of the drive pulleys positions to maintain an even operating radius or effective diameter of the belts on the pulleys during hydraulic pressure application for ratio changing or holding in between travel extremes. Another element is precise pulley groove width control employing accurate parts dimensions axially where the pulleys meet stops at the extremes of travel to essentially position each belt at like operating radii, or effective diameters, in both the high gear or cruise position and the low gear position, which are the positions at which the CVT will operate most of the time. The third element incorporates a differential gear set with very low friction performance. Preferably, the differential gear is installed between the two driven pulleys on the output shaft. This third element accommodates differences in output rotational speed of the output pulleys regardless of the implementation of the above-two elements. The differential therefore will accept the torque of each pulley separately even though there is a speed disparity and apply this torque to the output gear or sprocket, through the so-called spider gears of the differential, with minimal energy loss.

Accordingly, it is an object of this invention to provide a CVT system in a compact arrangement. The system should be capable of handling increased horsepower and should be mechanically producible using conventional materials and processes at reasonable cost. The present invention, therefore, has been engineered in a generic form that may be readily tailored to a specific application. However, it is envisioned that the present invention will have particular utility in the automotive industry, for example.

A dual belt and pulley system arranged and configured in accordance with the present invention can easily be understood by one familiar with the much used single system. It can be seen that the present system, incorporating a unique, compact mechanical arrangement of the elements necessary to ensure the compatibility of side-by-side operation very simply makes possible the doubling of the torque capacity of any such single system. The use of this practical concept today does not require "state of the art" development of the single belt and pulley design per se but whatever such advances may come to pass in the future, their capability can also be doubled. It should also be noted that the drive shaft, as explained herein, can become the driven shaft without modifications other than installation considerations of packaging.

One aspect of the present invention involves a continuously variable transmission comprising an input shaft. The input shaft supporting two input pulleys and the two input pulleys each comprising a fixed disk portion and a moveable disk portion. Axial movement of the moveable disk portion along the input shaft relative to the fixed disk portion changes an effective diameter of the pulley. The moveable disk portions of the two input pulleys are interposed along the input shaft between the fixed disk portions of the two input pulleys and a synchronizing member connects the two moveable disk portions such that the effective diameters of the two input pulleys are maintained as substantially equal by the synchronizing member.

Another aspect of the present invention involves a continuously variable transmission. The transmission comprises a first belt assembly and second belt assembly that extend between a torque transmitting shaft and a torque receiving shaft. The first belt assembly comprises a first drive pulley, a first driven pulley and a first belt while the second belt assembly comprises a second drive pulley, a second driven pulley and a second belt. The first drive pulley and the second drive pulley each comprise a moveable drive sheave portion and a fixed drive sheave portion. The moveable drive sheave portions are capable of movement along an axis of the torque transmitting shaft. The first driven pulley and the second driven pulley each comprise a fixed driven sheave portion and a moveable driven sheave portion. The moveable driven sheave portion is capable of movement along an axis of the torque receiving shaft. The moveable drive sheave portions are connected by a mechanical linkage to equalize the movement along the axis of the torque transmitting shaft between the first drive pulley and the second drive pulley. A differential connects the fixed driven sheave portions to the torque receiving shaft.

Another aspect of the present invention involves an axially expandable pulley arrangement comprising a first pulley disk and a second pulley disk. The first disk comprises a first front face, a first back face and a first hub while the second disk comprises a second front face, a second back face and a second hub. The second hub extends at least partially within the first hub and the first back face includes a circumferential flange. A piston is positioned within the flange and is slidably connected to the first back face. The piston also is connected to the second hub through an aperture defined in the first hub such that movement of the piston relative to the first pulley disk results in corresponding movement of the second pulley disk relative to the first pulley disk.

BRIEF DESCRIPTION OF THE DRAWINGS

These and other features, aspects, objects and advantages of the present invention will now be described with reference to drawings of a preferred embodiment of the present continuously variable transmission, which embodiment is intended to illustrate and not to limit the invention, and in which drawings:

FIG. 9 is a sectional view of the transmission of FIG. 1 taken along the line 9—9 in FIG. 2 showing the set of bolts that attach the spring loaded sleeve to the moveable half of the drive pulley and the position of the bolts in the set of slots formed in the stationary pulley half that allow axial movement.

DETAILED DESCRIPTION OF THE PRESENT INVENTION

Figure 1:
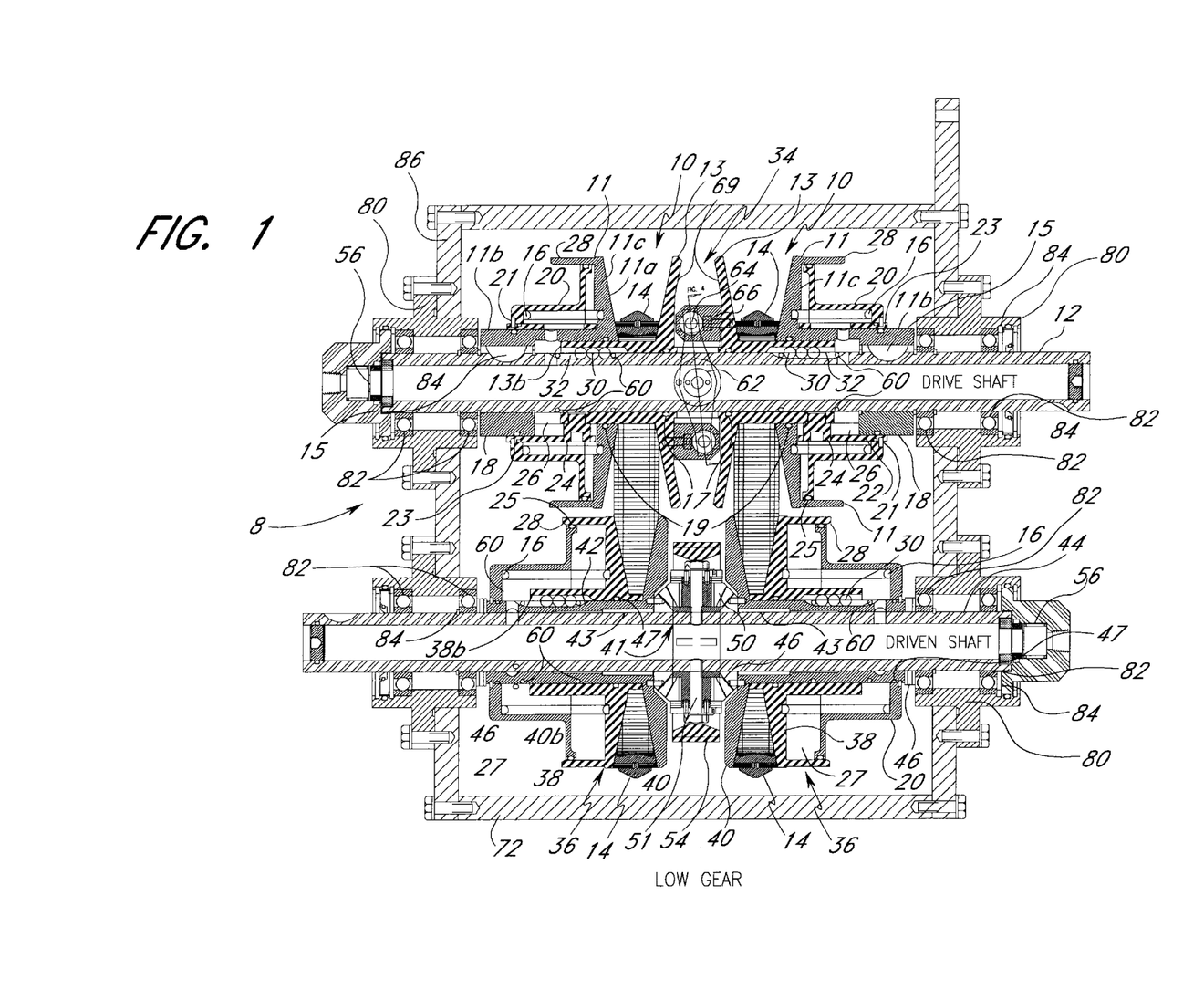
FIG. 1 is a cross-sectional view of a continuously variable transmission taken through a centerline of an input shaft and an output shaft, with the transmission positioned in a start or low gear position.

With reference to FIG. 1, a continuously variable transmission configured and arranged in accordance with the present invention is illustrated therein. The transmission, indicated generally by the reference numeral 8, has particular utility in the automotive industry. More specifically, the present transmission 8 has particular utility in transferring torque from an output shaft of an engine to a propulsion shaft in applications having engines operating within higher power bands of horsepower. Of course, the present transmission may also find utility in a wide range of other applications, which applications will be readily apparent to those of ordinary skill in the art after reviewing this disclosure.

With continued reference to FIG. 1, the illustrated transmission generally comprises a pair of drive pulleys 10. The drive pulleys 10 are mounted to a drive shaft 12 and are configured with a stationary portion 11 and a moveable portion 13. As will be recognized by those of ordinary skill in the art, each of the drive pulleys 10 drive a belt 14. Each belt 14, in turn, drives a corresponding driven pulley 36. Thus, the torque from the drive pulleys 10 is transferred to an output shaft or drive shaft 44 by the driven pulleys 36 through the belts 14. Both the drive 12 and driven shaft 44 are illustrated as hollow and may accept co-axial drive means, if desired. The belts are preferably a commercially available, steel segmented type.

Figure 6:
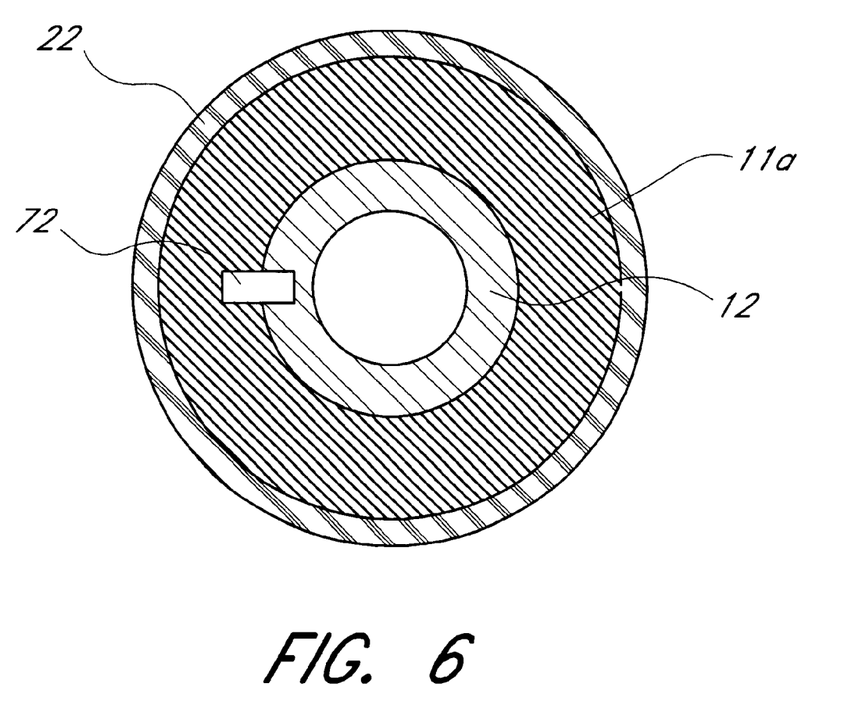
FIG. 6 is a cross-sectional view of the transmission of FIG. 1 taken along the line 6—6 in FIG. 2, which figure shows a method of clamping a stationary drive pulley half that is keyed to the drive shaft.

With continued reference to FIG. 1, the stationary pulley halves 11 of the drive pulleys 10 are preferably positioned to the outsides of the transmission 8 such that the moveable pulley halves 13 are interposed between the two stationary pulley halves 11. Moreover, the stationary pulley halves 11 are preferably rotationally keyed to the shaft 12 in addition to being interference fit to the shaft. Such a mounting arrangement advantageously secures the stationary pulley halves 11 to the shaft 12 for coupled rotational movement while the mounting arrangement limits the axial moveability of the pulley halves 11 relative to the shaft 12. In the illustrated transmission 8, the stationary pulley halves 11 are preferably heated and interference fit to the shaft 12. Moreover, with reference now to FIG. 6, a woodruff key 15 is preferably used to reinforce the coupling between the shaft 12 and the hub 11a of the stationary pulley halves 11. Of course, other mounting arrangements may become apparent to those of ordinary skill in the art.

With continued reference to FIG. 1, each moveable pulley half 13 is preferably slidably keyed to the shaft 12 by a set of key balls 30 in a corresponding set of axial ball races 32 formed along the shaft 12, the interaction of which will be described in detail below. The moveable pulley halves 13 have hubs 13b which are generally configured to slide along the shaft 12 into a pocket formed inside of a portion of the stationary pulley halves 11 (i.e., within the pulley hub 11b). It should be appreciated that the moveable pulley hub 13b is sized to contact a face of the pocket formed inside the stationary pulley hub 11b (see FIG. 2). In this manner, the face of the pocket and the end of the moveable pulley hub 13b form a positive stop for movement of the moveable pulley 13 toward the stationary pulley 11.

A seal 17 is positioned proximate a disk portion of each moveable pulley half 13. The seals 17 advantageously substantially seal the interface between the shaft 12 and each moveable pulley half 13. A seal 19 is also positioned proximate a disk portion of each stationary pulley half 11. These seals 19 advantageously substantially seal the sliding interface between the two pulley halves 11, 13. As will be recognized by those of ordinary skill in the art, the seals 17, 19 can reduce leakage of fluid used to generate hydraulic pressure, which is used to at least partially control relative positioning between the pulley halves 11, 13.

With continued reference to FIG. 1, a piston 20 and a sleeve 22 is slidably connected to each illustrated stationary pulley half 11. While the pistons 20 and sleeves 22 are formed independently of one another in the illustrated transmission 8, it is anticipated that the two components may be formed of a single member. The illustrated pistons 20 and sleeves 22 are preferably fixed to the moveable pulley halves for axial movement relative to the drive shaft 12. Comparing FIGS. 1 and 2, it is apparent that in some arrangements, the sleeves 22 may form positive stops with the back face 11c of the stationary pulley halves 11 such that movement of the moveable pulley halves 13 in a direction away from the stationary pulley halves 11 may be limited.

As mentioned above, the pistons 20 and sleeves 22 are preferably fixed to the moveable pulley halves 13. The illustrated pistons 20 are connected to the sleeves 22 with snap rings 21. A spring 16, which is in contact with an inner face of the piston 20, in cooperation with the snap rings 21, fix a relative positioning of the pistons 20 and sleeves 22. The spring load bears against the back faces 11c of the stationary pulley halves 11 and pushes the pistons 20 away from the back faces 11c. A seal 23 is also preferably positioned between each sleeve 22 and each stationary hub 11b. In addition, the hydraulically-actuated pistons 20 are preferably sealed with O-rings 25 at the cylinder walls 28, which are integrally formed with the stationary pulleys 11 in the illustrated transmission. Thus, the interface between both the sleeves 22 and the stationary hubs 11b and the pistons 20 and the stationary pulley 11 are substantially sealed.

Figure 7:
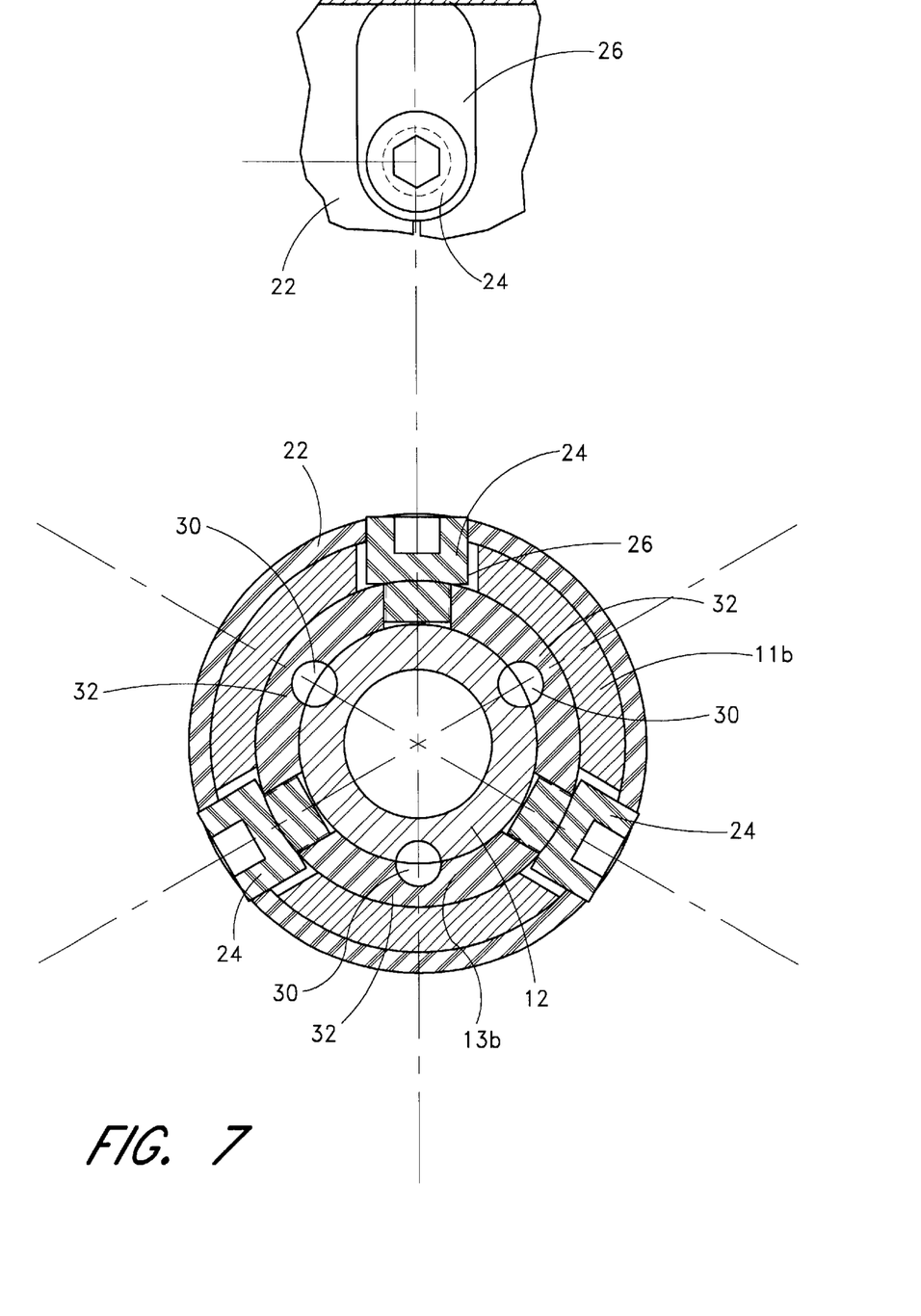
FIG. 7 is a cross-sectional view showing a position relationship of a set of ball keyway races relative to one another and relative to a set of bolts that attach a spring loaded sleeve to a moveable half of the drive pulley.

With reference now to FIGS. 1, 7 and 9, the sleeves 22 are attached to the moveable pulley half hubs 13b by a set of bolts 24 shown in a corresponding set of slots 26 in the stationary pulley half hubs 11b. The bolts 24 in the illustrated arrangement are recessed or countersunk to reduce the likelihood of interference between the bolts 24 and the spring 16. Preferably, the moveable pulley halves and the sleeves 22 are attached together in three locations, which are approximately 120 degrees apart about the circumference of the hubs 11b. As illustrated, this arrangement results in the pistons 20, sleeves 22 and the moveable pulley halves 13 being fixed together for axial movement relative to the stationary pulley halves 11.

Also, in some arrangements, the slots 26 may be sized and configured to form positive stops on the allowable relative axial travel. With reference to FIG. 9, one of the bolts 24 that connects the sleeve 22 to the moveable pulley halves of the drive pulleys is illustrated in a high gear position (i.e., that shown in FIG. 2). In transition to a low gear position (i.e., that shown in FIG. 1), the bolt 24 will move to the opposite end of the slot 26 provided in the shank of the stationary pulley half 11. The illustrated arrangement also causes the moveable pulley half 13 to be coupled for rotation with the stationary pulley half 11 relative to an axis of rotation of the drive shaft 12.

Figure 2:
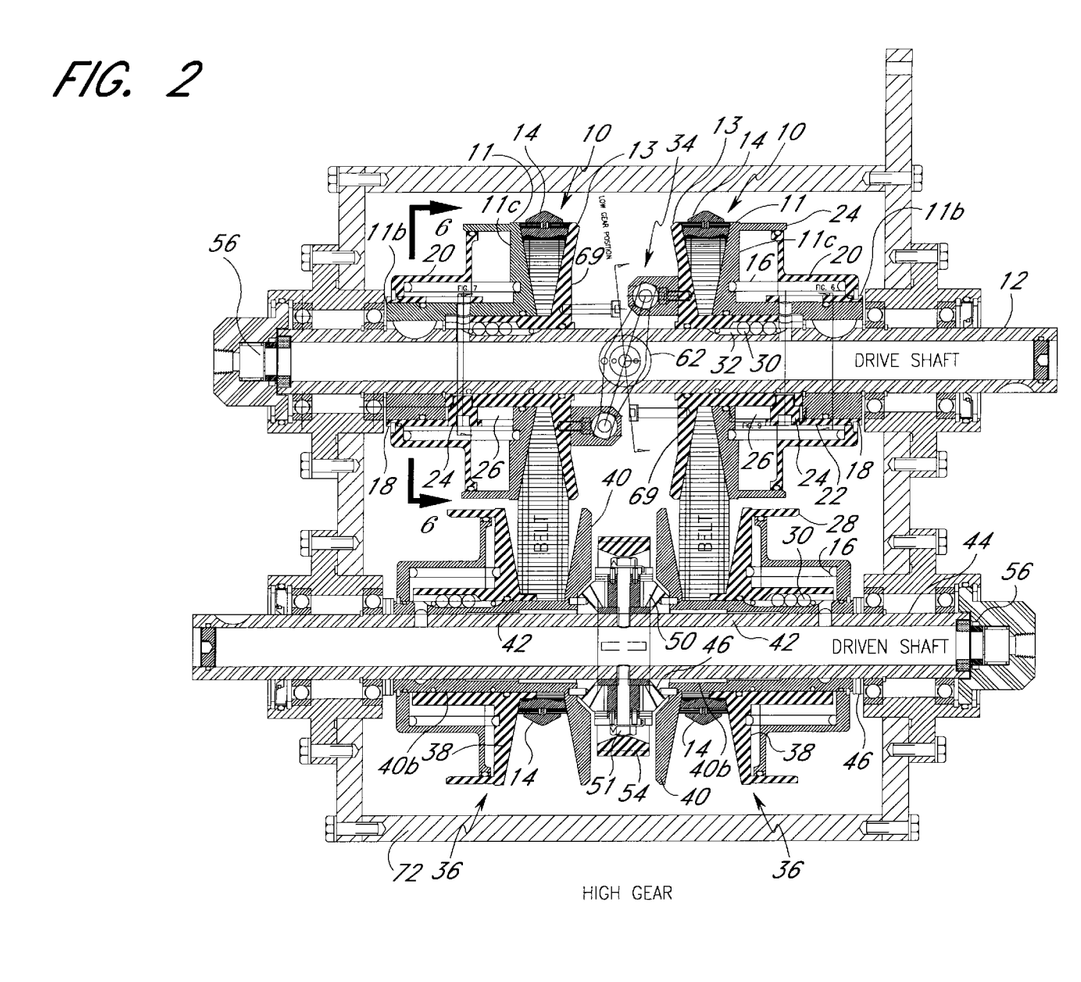
FIG. 2 is a cross-sectional view of the continuously variable transmission similar to that of FIG. 1, with the transmission positioned in a cruise or high gear position.

The two drive pulleys 10 illustrated in FIG. 1 are positioned with belts 14 at the smallest working diameter where the moveable pulley halves 13, which are axially moveable on the shaft 12, have been forced apart against the loadings of the springs 16. Comparing FIG. 1 to FIG. 2, the two drive pulleys in FIG. 2 are illustrated in a position in which the moveable pulley halves 13 and the stationary pulley halves 11 have been driven together under hydraulic forces exerted within piston chambers 27 (see FIG. 2) defined by the pistons 20, the sleeves 22, and the stationary pulley halves 13. Specifically, as the pressure within the piston chamber 27 increases, the volume of the piston chamber is forced to increase. Because the stationary pulley halves 13 are fixed relative to the shaft 12, the slidable piston 20 moves outward (i.e., away from the stationary pulley half). The outward motion of the piston 20 is transmitted to the moveable pulley half 13 through the sleeve 22 and the set of bolts 24. The outward motion therefore draws the two pulley halves 11, 13 together.

As mentioned above, the moveable pulley halves 13 are preferably dynamically keyed to the drive shaft 12 through the use of a ball and elongated axial ball race arrangement. Specifically, the generally cylindrical elongated axial ball races are formed partially along an outer surface of the shaft 12 and partially along an inner surface of the hub 13b. Thus, when the outer surface of the shaft 12 and the inner surface of the hub 13b are brought together and properly aligned, the generally cylindrical elongated axial ball races 32 are defined.

With reference to FIG. 7, the circumferential relationship of the ball grooves or races 32 and the bolts 24 that connect the spring loaded sleeves 22 to the moveable pulley shafts 13b is illustrated therein. Preferably, for rotational balance and other inertial reasons, the races are positioned equally about the circumference of the shaft 12 and hub 13b. More preferably, three races 32 are used and the three races 32 are interposed by the three fasteners 24 and slots 26.

With reference to FIG. 1, the races 32 may have a tapered configuration in transmissions formed with circular cutting tools (i.e., horizontal mills, etc.) Due to the tapered configuration, circular wire rings 60 are preferably installed in grooves around both shafts as shown. The wire rings 60 advantageously function as ball stops to prevent the balls 30 from jamming in the tapered groove extremities. As illustrated, at least three balls are preferably used; however, depending upon the radial and torsional loading of the shaft, more or less balls may also be used. Preferably, the length of the races 32 or the positioning of the wire rings 60 may be adjusted accordingly.

Figure 3:
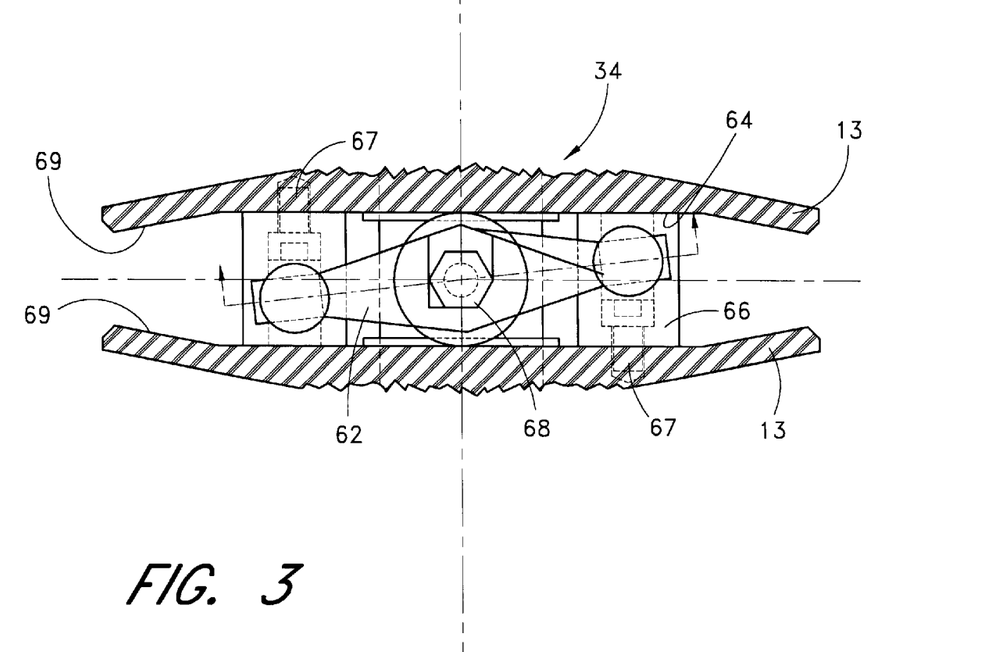
FIG. 3 is an enlarged view of a mechanical linkage configured and arranged to control a stroke of moveable halves of a pair of drive pulleys as illustrated in FIG. 1.
Figure 4:
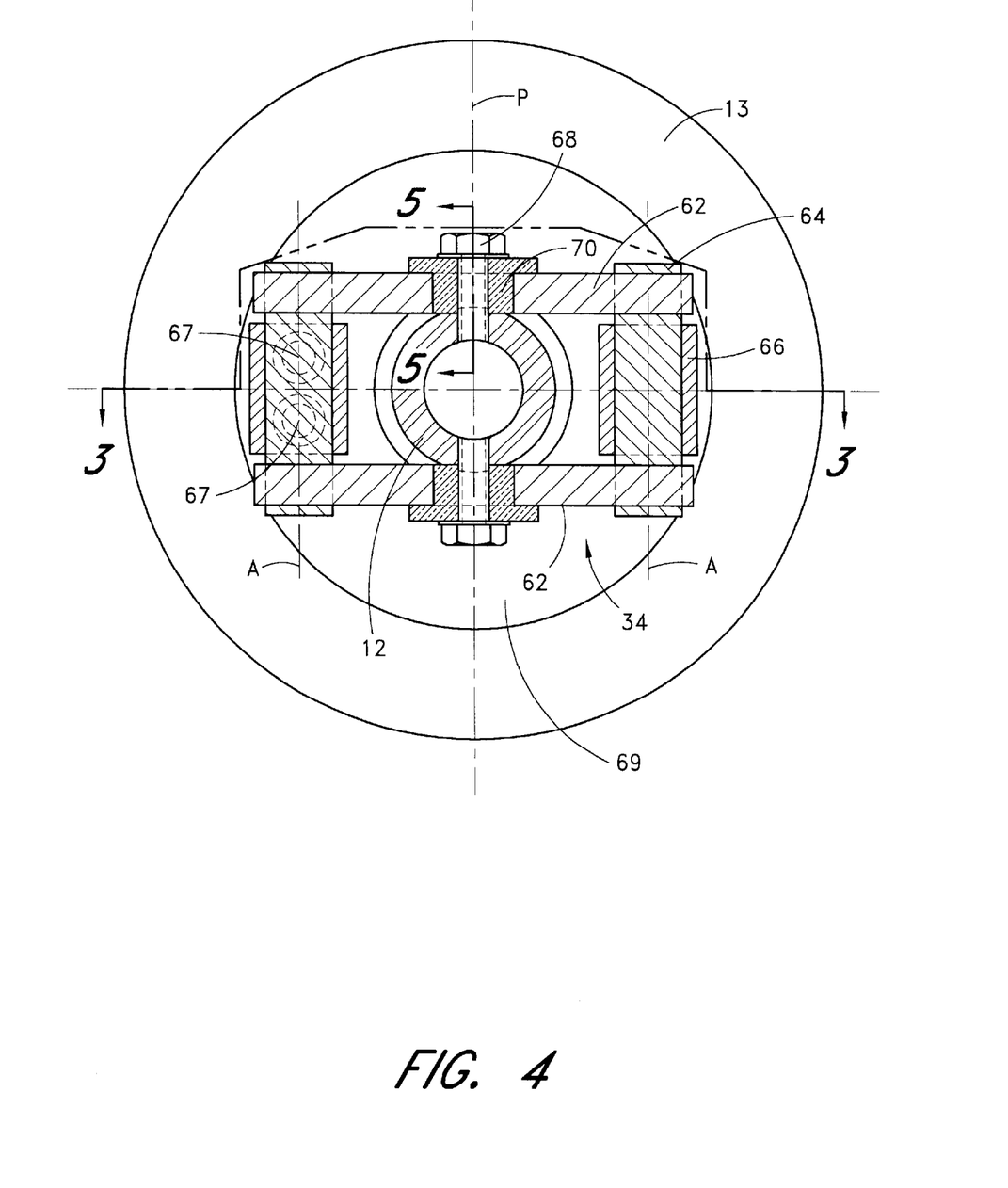
FIG. 4 is a cross-sectional view of the mechanical linkage of FIG. 3 taken through the line 4—4.
Figure 5:
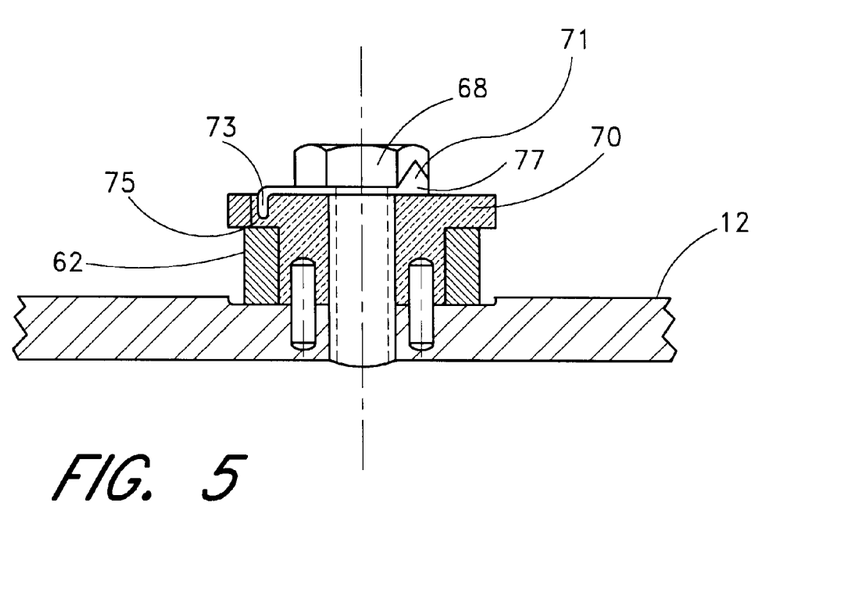
FIG. 5 is a cross-sectional view of a side of the mechanical linkage taken through the line 5—5 in FIG. 4 showing the attachment of the mechanical linkage to the drive shaft viewed at 90° from the drive shaft axis.

With reference now to FIGS. 1 and 3, an articulating mechanism or member 34, which preferably extends between the two moveable pulley halves 13, enforces substantially equal and generally synchronous relative movement of the pulley faces 11, 13 between the extremes of travel. With reference to FIGS. 3 and 5, the illustrated articulating member 34 generally comprises a pair of beams 62, which are slidably inserted into a corresponding pair of crossbars 64. The crossbars 64 preferably are inserted through rectangular anchor pieces 66 that are bolted by bolts 67 to inner faces 69 of the moveable pulley halves 13. The crossbars 64 are capable of rotation about a rotational axis A such that the beams 62 can pivot about a pivot axis P defined through a center bolt 68.

The illustrated center bolt is threaded securely to the drive shaft 12 and positions a bearing 70 around which the beams pivot when there is movement of the pulley halves 13 axially along the drive shaft 12. The bearing is preferably a roller bearing; however, any bearing configuration, including, taper, ball, and needle, may also be used. Moreover, the bearing 70 may be replaced by a bushing. The bushing should be a non-galling material such as brass or plastic.

With reference to FIG. 5, the bearing 70 preferably secures the articulating beam 62 in position with a shoulder. As illustrated, the bearing 70 is preferably securing by a locking tab 71. The locking tab 71 includes a short dog leg 73 which is inserted into a shallow slot 75. After the bolt 68 is tightened into position, a comer 77 of the locking tab 71 is bent upwards against the bolt 68 to the lock the bolt against undesirable rotation. Of course, other suitable mounting arrangements for the articulating beam and the bearing assembly may also be used.

With reference now to FIGS. 1 and 2, as the moveable pulley halves 13 move to a substantially closed position, such as that depicted in FIG. 2, the beams 62 allow only substantially equal movement of each pulley half relative to the pivot axis P. As the moveable pulley halves 13 move to a substantially open position, such as the depicted in FIG. 1, the beams 62 again only allow substantially equal movement of each pulley half 13 relative to the pivot axis P. Moreover, because the beams 62 are connected to both the shaft 12 and the inner faces 69 of the pulley halves 13, the two pulley halves are further coupled for substantially synchronous rotational movement about an axis of drive shaft rotation.

With reference again to FIG. 1, the pair of driven pulleys 36 are carried by an output shaft 44. As discussed above, the driven pulleys 36 receive torque from the drive pulleys 10 through the drive belt 14. Similar to the drive pulleys 10, the driven pulleys generally comprise moveable pulley halves 38 and stationary pulley halves 40. The stationary pulley halves 40 of the illustrated driven pulleys 36 are preferably positioned as the inside halves. This relative positioning is desirable in order to allow the belt 14 to better track between the two pulleys 10, 36. Moreover, because the moveable portions 13 of the drive pulley 10 are positioned to the inside for efficient slaving together, the stationary pulley halves 40 are better arranged to the inside on the driven pulley 36.

With continued reference to FIG. 1, the stationary pulley halves 40 are supported by the shaft 44; however, the stationary pulley halves 40 are preferably not keyed, splined or otherwise affixed to the shaft 44 such that the pulley halves 40 must rotate with the shaft without the use of an outside connection. While the pulley halves 40 may be fixed for rotation with the shaft in some applications, the present transmission 8 uses a differential 41, which will be described below, to transfer the rotation of the pulleys 36 to the driven shaft 44. The stationary pulley halves 40 and hubs 40b preferably also are not axially moveable on the output shaft 44 and are restrained from movement at the outer extremities by needle type thrust bearings 46. The thrust bearings also absorb or counter axial thrusts along the shaft 44 which may be set up by components of the differential 41.

The moveable pulley halves 38 and the stationary pulley halves 40 of each driven pulley 36 are preferably slidably keyed together. As discussed above, this dynamic torsion coupling, or dynamic keying, is accomplished by the balls 30 which are positioned in axial ball races 42. In the driven pulleys 36, the balls 30 and races 42 are preferably formed between an outside surface of the extended hubs 40b of the stationary pulley halves 40 and an inside surface of the hubs 38b of the moveable pulley halves 38. Also, preferably a needle bearing 43 is interposed between the shaft 44 and the hub 40b of each stationary pulley half 40. More preferably, the needle bearing 43 is positioned proximate the loading position along the shaft, which loading position is the point at which the belt 14 pulls on the shaft 44 in a direction generally normal to the axis of shaft rotation. In addition, as with the drive pulleys 10, seals 47 are preferably positioned between components that are axially moveable relative to one another (i.e., moveable pulley half 38 and stationary pulley half 40).

With reference now to FIGS. 1 and 2, the piston 20 of the driven pulley 36 advantageously forms the piston chamber 27 without the need for a piston sleeve 22. This is because the piston 20 of the driven pulley 36 does not translate relative to a hub. Instead, the moveable pulley halves 38 are moved by pressure changes within the piston chambers 27. Also, as discussed above, the springs 16 are also positioned within the piston chambers 27 of the driven pulleys 36.

With reference to FIG. 2, at the driven or output shaft 44, the driven pulleys 36 are illustrated with the belts 14 at an enlarged working diameter. The enlarged diameter is formed when the moveable pulley halves 38, which are axially movably on the shaft 44, have been forced inwardly by the springs 16 and the decreased hydraulic pressure within the piston chambers 27. As will be recognized by those of ordinary skill in the art, the driven pulley piston chamber pressure and the drive pulley piston chamber pressure control the movement of the pulleys together because the belt ideally will not stretch any substantial amount; however, this unbalanced force is typically effective to change the belt position (i.e., along the relative diameters) while the shafts are rotating. the driven pulleys 38, each stationary pulley half 40 incorporates a bevel gear 48 on its hub 40b. The bevel gears 48 are preferably centrally located around the output shaft 44 and form a portion of the differential 41. Thus, the bevel gears 48 preferably face each other and mesh with additional bevel gears 50, sometimes called spider gears. The spider gears 50 rotate on stub shafts 51 that are preferably an integral part of a gear hub or sprocket connector to the output or driven shaft 44. During operation of the transmission 8, the output shaft 44 is driven by the two pulley assembly bevel gears 48 bearing against the spider gears 50. If there is a difference in the speeds of the driven pulley assemblies, the spider gears 50 will rotate on the stub shafts 51 to accept the different speeds while the differential 41 continues transferring the output torque of each to the output shaft 44. If desired, an output can be taken from the alternate gear or chain drive 54 partially shown attached to the driven shaft in the same plane as the spider gears. To keep power losses to a minimum during the torque transfer with uneven pulley speeds, thrust and radial needle bearings, such as those shown, may be incorporated into the differential at loading points.

The pistons, cylinders and springs shown on both shaft assemblies are essentially the same in size and operation. The springs bias the moveable pulley halves to close the belt gap and the hydraulically operated pistons add to the spring force when selectively pressurized. For example, FIG. 1 shows the unit in the low gear or start mode and as rotation takes place, at some point the hydraulic control system (not part of this invention) will sense the need to change the position of the belt 14 on the pulleys to an intermediate ratio as the vehicle accelerates from a stop. A higher hydraulic pressure then will be introduced to the piston chambers 27 at the drive shaft 12 than that at the piston chambers 27 of the driven shaft 44 (porting not shown). Given enough difference in pressure, the belt gap on the drive side will start to close and the belts will climb the faces to a larger radius of operation. Since the belts cannot stretch, they are pulled deeper into the gaps of the driven pulleys 36 forcing the gaps to widen and compress the springs 16. If the higher pressure continues at the drive shaft 12 end the drive ratio will reach its highest point for cruise as is shown referring to FIG. 2. To move the ratio back to the low gear or start position, the higher pressure is applied to the cylinders 18 at the driven shaft 44 to reverse the procedure, or it can be modulated somewhere in between by selectively changing the hydraulic pressure to the cylinders.

Hydraulic control pressure preferably enters each shaft interior through the fittings and mechanical shaft seals shown on each shaft from a source not shown and enters and exits the cylinders through ports provided. Advantageously, some hydraulic leakage can occur through the joints and along the shafts the way the assembly is shown, which leakage is intended to keep the bearings and sliding fits fully lubricated. It is anticipated, however, that further partial sealing can be accomplished given the need.

Figure 8:
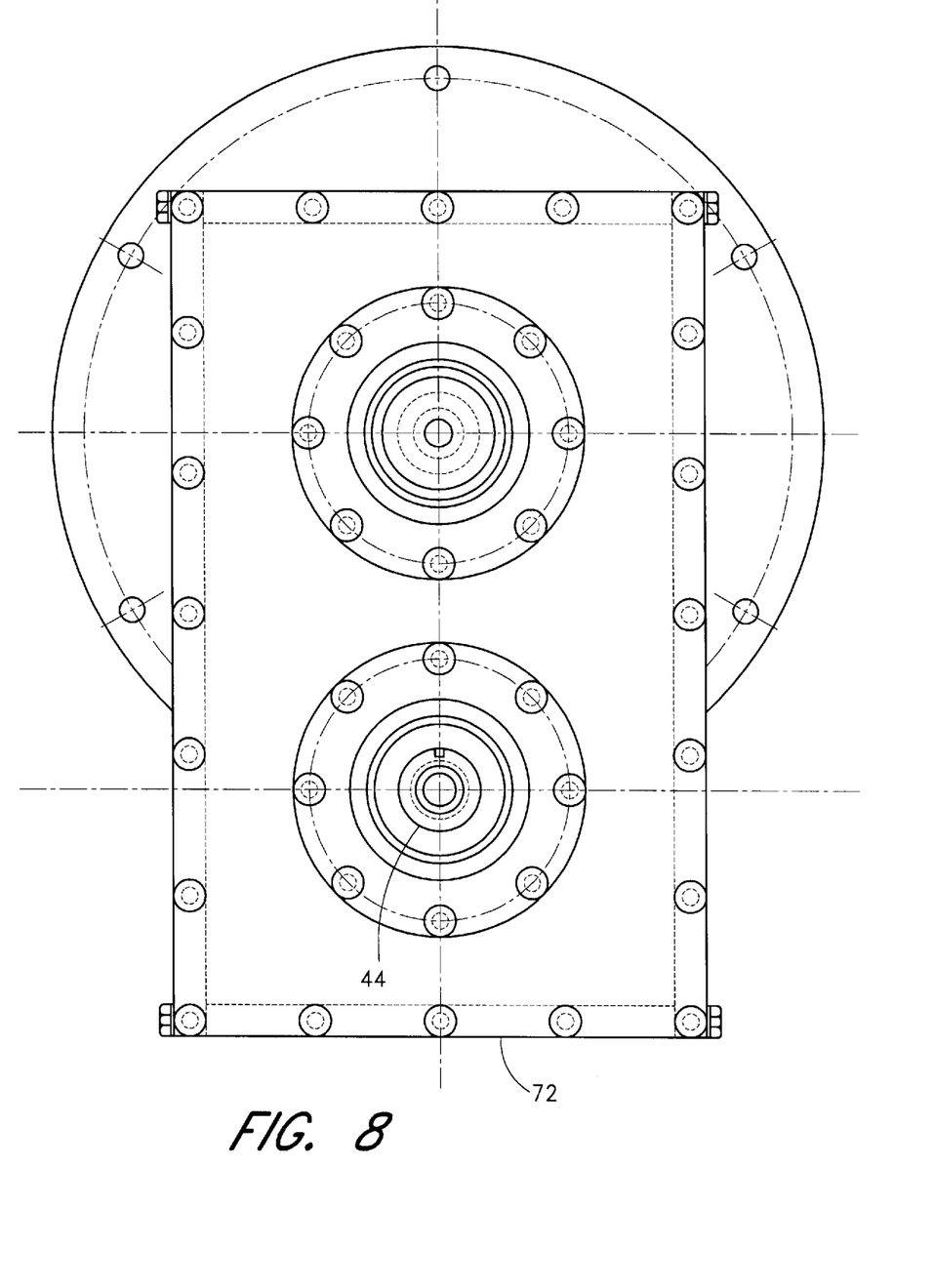
FIG. 8 is an end view of a transmission casing.

With reference now to FIG. 8, the transmission 8 is illustrated after being installed in the case or housing 22 as viewed from the output shaft 44. The case 22 as shown forms a suitable enclosure for the illustrated transmission 8. The illustrated case 22 features a bolt circle attachment geometry at the drive end. The bolt circle attachment preferably would support the attachment of the case 22 and the transmission 8 to a power source. Moreover, the output shaft 44 position and the hydraulic fitting port for control hydraulics the driving shaft are illustrated. Of course, many other case 22 structures may also occur to one of ordinary skill in the art.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. In addition, while the illustrated transmission uses two separate hydraulic chambers (i.e., piston chambers), it is anticipated that movement of a single moveable pulley half may be used to cause the movement in the other moveable pulley half. Moreover, not all of the features, aspects and advantages are necessarily required to practice the present invention. Accordingly, the scope of the present invention is intended to be defined only by the claims that follow.

What is claimed is:

1. A continuously variable transmission comprising a first shaft supporting two first pulleys, said two first pulleys each comprising a fixed disk portion and a moveable disk portion whereby axial movement of said moveable disk portions along said first shaft relative to said fixed disk portions changes an effective diameter of said two first pulleys, said moveable disk portions of said two first pulleys being interposed along said first shaft between said fixed disk portions of said two first pulleys, a synchronizing member connecting said moveable disk portions such that the effective diameters of said two first pulleys are maintained substantially equal by said synchronizing member, at least a portion of each of said moveable disk portions being axially moveable between said first shaft and at least a portion of each corresponding fixed disk portion of said fixed disk portions, said at least a portion of each of said moveable disk portions being dynamically keyed to said first shaft using a plurality of balls positioned within a substantially cylindrical race formed between said moveable disk portions and said first shaft.

2. The transmission of claim 1, wherein said synchronizing member is pivotably secured to said first shaft.

3. The transmission of claim 1 further comprising a second shaft, two second pulleys being journalled on said second shaft, and a pair of belts connecting said two second pulleys to said two first pulleys.

4. The transmission of claim 2, wherein said synchronizing member comprises two beams.

5. The transmission of claim 3 further comprising a differential positioned between said two second pulleys.

6. The transmission of claim 1, wherein said two second pulleys each comprise a fixed pulley half, said differential being connected to said two fixed pulley halves.

7. A continuously variable transmission comprising a first shaft supporting two first pulleys, said two first pulleys each comprising a fixed disk portion and a moveable disk portion whereby axial movement of said moveable disk portions along said first shaft relative to said fixed disk portions changes an effective diameter of said two first pulleys, said moveable disk portions of said two first pulleys being interposed along said first shaft between said fixed disk portions of said two first pulleys, a synchronizing member connecting said moveable disk portions such that the effective diameters of said two first pulleys are maintained substantially equal by said synchronizing member, a piston being connected to each of said moveable disk portions, said stationary disk portions being interposed between said piston and said moveable disk portion of each of said two first pulleys, a chamber at least partially defined by said stationary disk portion and said piston, and axial movement of said moveable disk portion relative to said stationary disk portion being at least partially controlled by a pressure within said chamber.

8. The transmission of claim 7, wherein at least a portion of said moveable disk portion is axially moveable between at least a portion of said fixed disk portion and said first shaft.

9. The transmission of claim 7, wherein said synchronizing member is pivotably secured to said first shaft.

10. The transmission of claim 7, wherein at least a portion of said moveable disk portion is axially moveable between at least a portion of said fixed disk portion and said first shaft.

11. The transmission of claim 7 further comprising a second shaft, two second pulleys being journalled on said second shaft, and a pair of belts connecting said two second pulleys to said two first pulleys.

12. The transmission of claim 8, wherein said at least a portion of each of said moveable disk portions is dynamically keyed to said first shaft.

13. The transmission of claim 9, wherein said synchronizing member comprises two beams.

14. The transmission of claim 10, wherein said at least a portion of each of said moveable disk portions being dynamically keyed to said first shaft.

15. The transmission of claim 11 further comprising a differential positioned between said two second pulleys.

16. The transmission of claim 15, wherein said two second pulleys each comprise a fixed pulley half, said differential being connected to said two fixed pulley halves.

17. A continuously variable transmission comprising a first shaft supporting two first pulleys, said two first pulleys each comprising a fixed disk portion and a moveable disk portion whereby axial movement of said moveable disk portions along said first shaft relative to said fixed disk portions changes an effective diameter of said two first pulleys, said moveable disk portions of said two first pulleys being interposed along said first shaft between said fixed disk portions of said two first pulleys, a synchronizing member connecting said moveable disk portions such that the effective diameters of said two first pulleys are maintained substantially equal by said synchronizing member, a second shaft extending generally parallel to said first shaft, two second pulleys being journalled on said second shaft, a pair of belts connecting said two second pulleys to said two first pulleys, a differential positioned between said two second pulleys, said two second pulleys each comprising a fixed pulley half, said differential being connected to said two fixed pulley halves and said differential being connected to a chain drive.

18. A continuously variable transmission comprising a first shaft supporting two first pulleys, said two first pulleys each comprising a fixed disk portion and a moveable disk portion whereby axial movement of said moveable disk portions along said first shaft relative to said fixed disk portions changes an effective diameter of said two first pulleys, said moveable disk portions of said two first pulleys being interposed along said first shaft between said fixed disk portions of said two first pulleys, a synchronizing member connecting said moveable disk portions such that the effective diameters of said two first pulleys are maintained substantially equal by said synchronizing member, a second shaft extending generally parallel to said first shaft, two second pulleys being journalled on said second shaft, a pair of belts connecting said two second pulleys to said two first pulleys and said first shaft and said second shaft each forming a flow lumen for hydraulic fluids.

19. A continuously variable transmission comprising a first shaft supporting two first pulleys, said two first pulleys each comprising a fixed disk portion and a moveable disk portion whereby axial movement of said moveable disk portions along said first shaft relative to said fixed disk portions changes an effective diameter of said two first pulleys, said moveable disk portions of said two first pulleys being interposed along said first shaft between said fixed disk portions of said two first pulleys, a synchronizing member connecting said moveable disk portions such that the effective diameters of said two first pulleys are maintained substantially equal by said synchronizing member, a second shaft extending generally parallel to said first shaft, two second pulleys being journalled on said second shaft, a pair of belts connecting said two second pulleys to said two first pulleys and said two first pulleys and said two second pulleys being hydraulically actuated.

20. The transmission of claim 19, wherein said synchronizing member is pivotably secured to said first shaft.

21. The transmission of claim 19, wherein at least a portion of said moveable disk portion is axially moveable between at least a portion of said fixed disk portion and said first shaft.

22. The transmission of claim 19 further comprising a second shaft, two second pulleys being journalled on said second shaft, and a pair of belts connecting said two second pulleys to said two first pulleys.

23. The transmission of claim 20, wherein said synchronizing member comprises two beams.

24. The transmission of claim 21, wherein said at least a portion of each of said moveable disk portions being dynamically keyed to said first shaft.

25. The transmission of claim 22 further comprising a differential positioned between said two second pulleys.

26. The transmission of claim 25 wherein said two second pulleys each comprise a fixed pulley half, said differential being connected to said two fixed pulley halves.

27. A continuously variable transmission comprising a first belt assembly and second belt assembly extending between a first shaft and a second shaft, said first belt assembly comprising a first first-shaft pulley, a first second-shaft pulley and a first belt, said second belt assembly comprising a second first-shaft pulley, a second second-shaft pulley and a second belt, said first first-shaft pulley and said second first-shaft pulley each comprising a moveable first-shaft sheave portion and a fixed first-shaft sheave portion, said moveable first-shaft sheave portions being capable of movement along an axis of said first shaft, said first second-shaft pulley and said second second-shaft pulley each comprising a fixed second-shaft sheave portion and a moveable second-shaft sheave portion, said moveable second-shaft sheave portion being capable of movement along an axis of said second shaft, said moveable first-shaft sheave portions being connected by a mechanical linkage to equalize said movement along said axis of said first shaft between said first first-shaft pulley and said second first-shaft pulley, a differential connecting said fixed second-shaft sheave portions to said second shaft, and a piston being attached to each moveable first-shaft sheave portion, said piston propelling said moveable first-shaft sheave portion along said axis of said first shaft relative to said fixed first-shaft sheave portion.

28. The transmission of claim 27, wherein said fixed first-shaft sheave portion is interposed between said moveable first-shaft sheave portion and at least a portion of said piston.

29. The transmission of claim 27, wherein said moveable first-shaft sheave portions are dynamically splined to said first shaft.

30. The transmission of claim 27, wherein said fixed first-shaft sheave portions and said moveable first-shaft sheave portions arc secured together for rotation while allowing relative axial movement.

31. A continuously variable transmission comprising a first belt assembly and second belt assembly extending between a first shaft and a second shaft, said first belt assembly comprising a first first-shaft pulley, a first second-shaft pulley and a first belt, said second belt assembly comprising a second first-shaft pulley, a second second-shaft pulley and a second belt, said first first-shaft pulley and said second first-shaft pulley each comprising a moveable first-shaft sheave portion and a fixed first-shaft sheave portion, said moveable first-shaft sheave portions being capable of movement along an axis of said first shaft, said first second-shaft pulley and said second second-shaft pulley each comprising a fixed second-shaft sheave portion and a moveable second-shaft sheave portion, said moveable second-shaft sheave portion being capable of movement along an axis of said second shaft, said moveable first-shaft sheave portions being connected by a mechanical linkage to equalize said movement along said axis of said first shaft between said first first-shaft pulley and said second first-shaft pulley, a differential connecting said fixed second-shaft sheave portions to said second shaft, and a piston being attached to each moveable second-shaft sheave portion, said piston propelling said moveable second-shaft sheave portion along said axis of said second shaft relative to said fixed second-shaft sheave portion.

32. The transmission of claim 31, wherein said moveable second-shaft sheave portion is interposed between said fixed second-shaft sheave portion and at least a portion of said piston.

33. The transmission of claim 31, wherein a piston is attached to each moveable first-shaft sheave portion, said piston propelling said moveable first-shaft sheave portion along said axis of said first shaft relative to said fixed first-shaft sheave portion.

34. The transmission of claim 33, wherein said fixed first-shaft sheave portion is interposed between said moveable first-shaft sheave portion and at least a portion of said piston that is attached to said moveable first-shaft sheave portion.

35. A continuously variable transmission comprising a first belt assembly and second belt assembly extending between a first shaft and a second shaft, said first belt assembly comprising a first first-shaft pulley, a first second-shaft pulley and a first belt, said second belt assembly comprising a second first-shaft pulley, a second second-shaft pulley and a second belt, said first first-shaft pulley and said second first-shaft pulley each comprising a moveable first-shaft sheave portion and a fixed first-shaft sheave portion, said moveable first-shaft sheave portions being capable of movement along an axis of said first shaft, said first second-shaft pulley and said second second-shaft pulley each comprising a fixed second-shaft sheave portion and a moveable second-shaft sheave portion, said moveable second-shaft sheave portion being capable of movement along an axis of said second shaft, said moveable first-shaft sheave portions being connected by a mechanical linkage to equalize said movement along said axis of said first shaft between said first first-shaft pulley and said second first-shaft pulley, a differential connecting said fixed second-shaft sheave portions to said second shaft, said moveable first-shaft sheave portions being dynamically splined to said first shaft and a set of balls captured within a race defined at an interface between said moveable first-shaft sheave portions and said first shaft forming the dynamically splined connection.

36. A continuously variable transmission comprising a first belt assembly and second belt assembly extending between a first shaft and a second shaft, said first belt assembly comprising a first first-shaft pulley, a first second-shaft pulley and a first belt, said second belt assembly comprising a second first-shaft pulley, a second second-shaft pulley and a second belt, said first first-shaft pulley and said second first-shaft pulley each comprising a moveable first-shaft sheave portion and a fixed first-shaft sheave portion, said moveable first-shaft sheave portions being capable of movement along an axis of said first shaft, said first second-shaft pulley and said second second-shaft pulley each comprising a fixed second-shaft sheave portion and a moveable second-shaft sheave portion, said moveable second-shaft sheave portion being capable of movement along an axis of said second shaft, said moveable first-shaft sheave portions being connected by a mechanical linkage to equalize said movement along said axis of said first shaft between said first first-shaft pulley and said second first-shaft pulley, a differential connecting said fixed second-shaft sheave portions to said second shaft, said fixed first-shaft sheave portions and said moveable first-shaft sheave portions are secured together for rotation while allowing relative axial movement and said fixed first-shaft sheave portions including a slot and said moveable drive sheave portions including a shaft that translates within said slot.

37. The transmission of claim 36, wherein the shaft is a threaded fastener.

38. An axially expandable pulley arrangement comprising a first pulley disk and a second pulley disk, said first disk comprising a first front face, a first back face and a first hub, said second disk comprising a second front face, a second back face and a second hub, said second hub extending at least partially within said first hub, said first back face including a circumferential flange, a piston being positioned within said flange and being slidably connected to said first back face, said piston also being connected to said second hub through an aperture defined in said first hub such that movement of said piston relative to said first pulley disk results in corresponding movement of said second pulley disk relative to said first pulley disk.

39. The pulley arrangement of claim 38, wherein said aperture comprises an elongated slot extending in an axial direction along said first hub.

40. The pulley arrangement of claim 39, wherein a shaft connects said piston and said second hub.

41. The pulley arrangement of claim 40, wherein said shaft is a threaded fastener.

* * * * *